United States Patent
Bayh, III et al.

(10) Patent No.: US 10,612,345 B2
(45) Date of Patent: Apr. 7, 2020

(54) 3D PRINTED FLAPPER VALVE

(71) Applicant: HALLIBURTON ENERGY SERVICES, INC., Houston, TX (US)

(72) Inventors: Russell Irving Bayh, III, Carrollton, TX (US); Xiaoguang Allan Zhong, Plano, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 243 days.

(21) Appl. No.: 15/542,734

(22) PCT Filed: Feb. 17, 2015

(86) PCT No.: PCT/US2015/016179
§ 371 (c)(1),
(2) Date: Jul. 11, 2017

(87) PCT Pub. No.: WO2016/133497
PCT Pub. Date: Aug. 25, 2016

(65) Prior Publication Data
US 2017/0356273 A1    Dec. 14, 2017

(51) Int. Cl.
| | |
|---|---|
| *E21B 34/10* | (2006.01) |
| *F16K 1/20* | (2006.01) |
| *E21B 34/00* | (2006.01) |
| *B33Y 80/00* | (2015.01) |
| *E21B 21/08* | (2006.01) |
| *F16K 1/18* | (2006.01) |

(52) U.S. Cl.
CPC ............ *E21B 34/10* (2013.01); *B33Y 80/00* (2014.12); *E21B 21/08* (2013.01); *F16K 1/2014* (2013.01); *E21B 2034/005* (2013.01); *F16K 1/18* (2013.01)

(58) Field of Classification Search
CPC ..................... E21B 2034/005; F16K 1/2014
See application file for complete search history.

(56) References Cited

U.S. PATENT DOCUMENTS

| | | | |
|---|---|---|---|
| 3,788,595 A | * | 1/1974 | Colonna ............... E21B 34/10 251/58 |
| 4,134,455 A | | 1/1979 | Read |

(Continued)

OTHER PUBLICATIONS

International Search Report and Written Opinion for International Application No. PCT /US2015/016179 dated Sep. 25, 2015. (14 pages).

*Primary Examiner* — Shane Bomar
(74) *Attorney, Agent, or Firm* — Haynes and Boone, LLP

(57) ABSTRACT

A method and apparatus including a subsurface tool, such as a flapper closure valve, that has an integrally formed body and that includes at least one of an internal void located within the body of the flapper closure plate; and an indentation extending from an exterior surface of the body of the flapper closure plate, the indentation having an opening defining a first dimension along a first direction at the exterior surface of the body, the indentation defining an indentation surface extending within the body, the indentation surface defining a second dimension along the first direction within the body, the second dimension being greater than the first dimension. In one or more exemplary embodiments, the flapper closure plate is at least partially manufactured using an additive manufacturing process.

21 Claims, 10 Drawing Sheets

(56) References Cited

U.S. PATENT DOCUMENTS

| | | | | |
|---|---|---|---|---|
| 4,469,174 A * | 9/1984 | Freeman | | E21B 17/14 166/202 |
| 4,474,241 A | 10/1984 | Freeman | | |
| 4,825,902 A | 5/1989 | Helms | | |
| 5,884,705 A * | 3/1999 | Hill, Jr. | | E21B 34/101 166/324 |
| 6,196,261 B1 * | 3/2001 | Dennistoun | | E21B 34/06 137/516.25 |
| 6,296,061 B1 * | 10/2001 | Leismer | | E21B 34/101 166/324 |
| 2001/0022194 A1 * | 9/2001 | Davis | | E21B 34/06 137/527 |
| 2002/0084076 A1 * | 7/2002 | Ives | | E21B 34/101 166/324 |
| 2002/0153138 A1 | 10/2002 | Ferg | | |
| 2004/0000407 A1 * | 1/2004 | Hernandez | | E21B 34/06 166/386 |
| 2009/0114395 A1 * | 5/2009 | Holmes | | E21B 34/08 166/319 |
| 2009/0236102 A1 * | 9/2009 | Guest | | E21B 33/124 166/386 |
| 2011/0108749 A1 | 5/2011 | Xu et al. | | |
| 2014/0116217 A1 * | 5/2014 | Hashish | | B24C 5/02 83/177 |
| 2014/0190475 A1 * | 7/2014 | Davenport | | B01F 3/04248 128/200.29 |
| 2014/0209181 A1 * | 7/2014 | Lucas | | F16K 49/00 137/15.04 |
| 2015/0060042 A1 * | 3/2015 | Shilpiekandula | | B22F 3/008 166/65.1 |
| 2015/0107680 A1 * | 4/2015 | Chapman, Jr. | | F04C 29/126 137/12 |
| 2015/0107689 A1 * | 4/2015 | Walkowski | | B60K 15/03519 137/202 |
| 2016/0131165 A1 * | 5/2016 | Collins | | F15B 13/0807 137/544 |
| 2017/0051493 A1 * | 2/2017 | Xu | | E03F 7/04 |
| 2017/0342797 A1 * | 11/2017 | Murphree | | E21B 33/1208 |

* cited by examiner

3D PRINTED FLAPPER VALVE

TECHNICAL FIELD

The present disclosure relates generally to subsurface equipment that is at partially manufactured using additive manufacturing, such as 3D printing, and, more specifically, to a printed flapper plate of a flapper valve having complex internal geometries.

BACKGROUND

Surface controlled, subsurface safety valves are commonly used to shut in oil and gas wells in the event of a failure or hazardous condition at the well surface. Such safety valves are typically fitted into the production tubing and operate to block the flow of formation fluid upwardly therethrough. The subsurface safety valve provides shutoff of production flow in response to a variety of out-of-range safety conditions that can be sensed or indicated at the surface. For example, the out-of-range safety conditions may include a fire on the platform, a high or low flow line temperature or pressure condition, or operator override.

During production, a hydraulically operated subsurface safety valve is typically held open by the application of hydraulic fluid pressure conducted to the subsurface safety valve through an auxiliary control conduit, which extends along the tubing string within an annulus between the tubing and the well casing. Flapper type subsurface safety valves utilize a closure plate which is actuated by longitudinal movement of a hydraulically actuated piston, which can be a rod-style piston, a concentric tubular piston, or an electromechanical operator. The flapper valve closure plate is maintained in the valve open position by an operator tube which is extended by the application of hydraulic pressure onto the piston. A pump at the surface pressurizes a reservoir which delivers regulated hydraulic control pressure through the control conduit. Hydraulic fluid is pumped into a variable volume pressure chamber and acts against the crown of the piston. When, for example, the production fluid pressure rises above or falls below a preset level, the control pressure is relieved such that the piston and operator tube are retracted to the valve closed position by a return spring. The flapper plate is then rotated to the valve closed position by a torsion spring or tension member.

Often, the flapper valve has a valve seat that includes a downwardly facing, conical segment having a sloping sealing surface and the flapper closure plate has a complementary, sloping annular sealing surface which is adapted for surface-to-surface engagement against the conical valve seat surface. Typically, the flapper closure plate is supported for rotational movement by a hinge assembly which includes a hinge pin and a torsion spring or tension member. It will be appreciated that structural distortion of the flapper valve closure plate, or damage to the hinge assembly which supports the flapper closure plate, can cause misalignment of the respective sealing surfaces, thereby producing a leakage path through the safety valve.

Such misalignment will prevent correct seating and sealing of the flapper closure plate, and a large amount of formation fluid may escape through the damaged valve, which may cause waste and pollution. During situations involving damage to the wellhead, the well flow must be shut off completely before repairs can be made and production resumed. Even a small leak through the flapper safety valve in a gas well can cause catastrophic damage.

Generally, the flapper closure plate is machined from forged billet stock using multi-axis milling processes, which ensure consistent material properties. However, machining via traditional removal techniques of the downhole equipment may limit the geometries and design of the downhole equipment. For example, the flapper closure plate is generally a solid metal piece having a geometry that, while increasing performance of the flapper valve, inhibits complex machining to include additional features. As valve size increases, flapper size and weight also increase, which imparts higher loads and stresses on the torsion closing spring, often requiring alternate closing spring structures and methods or damage to the valve. Increased flapper weight may result in slower valve closure, which may decrease safety valve performance.

The present disclosure is directed to printed subsurface equipment, such as a printed flapper plate, and methods that overcome one or more of the shortcomings in the prior art.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
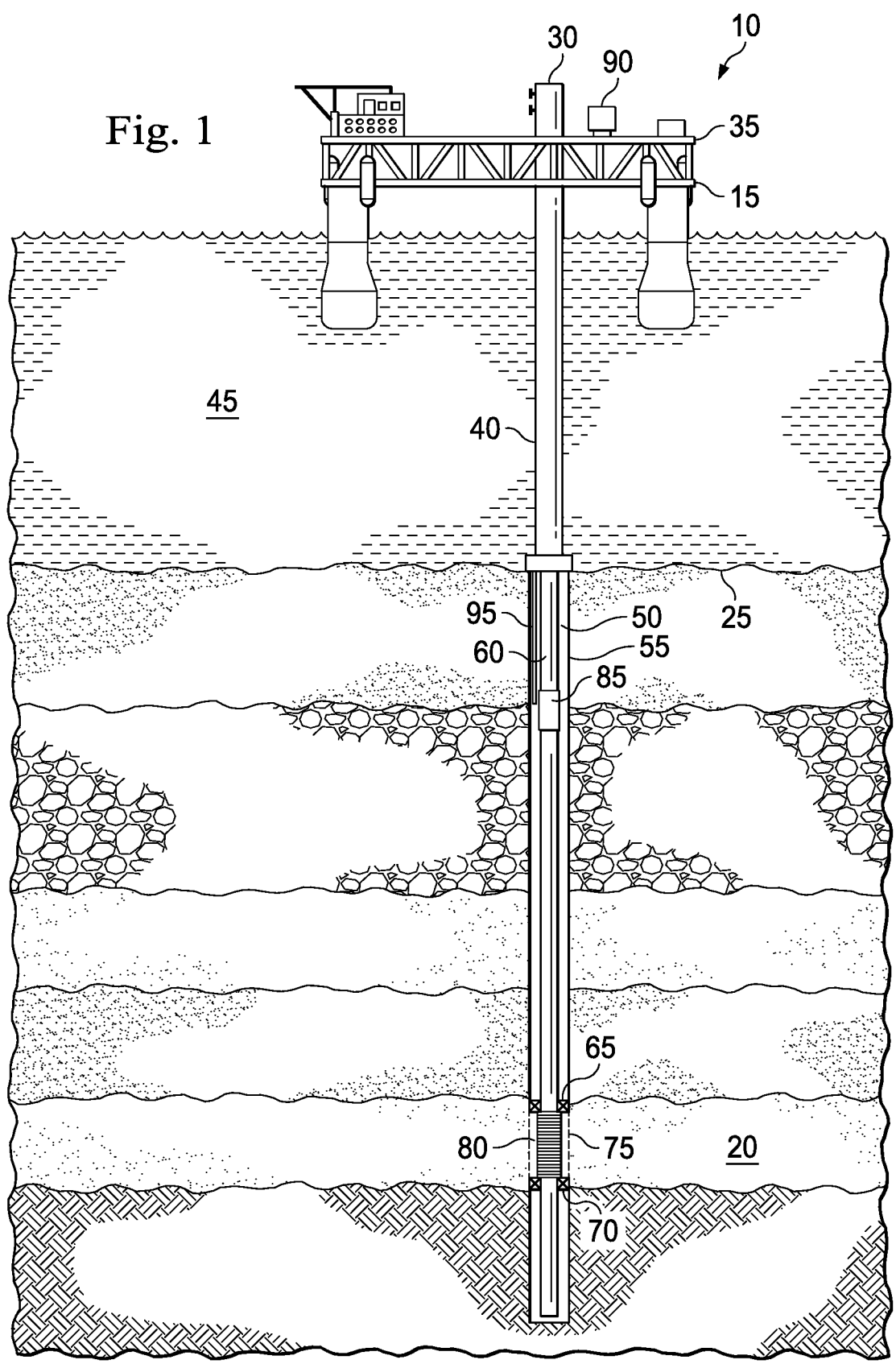
FIG. 1 is a schematic illustration of an offshore oil or gas production platform operating a subsurface safety valve, according to an exemplary embodiment of the present disclosure.

Illustrative embodiments and related methods of the present disclosure are described below as they might be employed in printed subsurface equipment. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

Referring to FIG. 1, a subsurface safety valve in use with an offshore oil and gas production platform is schematically illustrated and generally designated 10. In one or more exemplary embodiments, a semi-submersible platform 15 is centered over a submerged oil and gas formation 20 located below a sea floor 25. In some embodiments, a wellhead 30 is located on a deck 35 of the platform 15. A well 40 may extend through the sea 45 and penetrate the various earth strata including the formation 20 to form a wellbore 50. In one or more exemplary embodiments, disposed within the wellbore 50 is a casing 55 and disposed within the casing 55 and extending from the wellhead 30 is a production tubing 60. In some embodiments, a pair of seal assemblies 65, 70 provide a seal between the tubing 60 and the casing 55 to prevent the flow of production fluids therebetween. During production, formation fluids often enter the wellbore 50 through perforations 75 of the casing 55 and travel into the tubing 60 through a sand control device 80 to the wellhead 30. In one or more exemplary embodiments, a subsurface safety valve 85 is located within the production tubing 60 and seals the wellhead 30 from the well formation 20 in the event of abnormal conditions. In one or more exemplary embodiments, the subsurface safety valve 85 includes a flapper valve closure plate that, during production from the well formation 20, is maintained in the valve open position by hydraulic control pressure received from a surface control system 90 through a control conduit 95.

Even though FIG. 1 depicts a vertical wellbore, it should be understood by those skilled in the art that the apparatus according to the present disclosure is equally well suited for use in wellbores having other orientations including horizontal wellbores, slanted wellbores, multilateral wellbores or the like. Also, even though FIG. 1 depicts an offshore operation, it should be understood by those skilled in the art that the apparatus according to the present disclosure is equally well suited for use in onshore operations.

Referring now to FIGS. 2A, 2B, 3A and 3B, the subsurface safety valve 85 is illustrated. In one or more exemplary embodiments, the safety valve 85 is connected directly in series with the production tubing 60. In one or more exemplary embodiments, hydraulic control pressure is conducted in communication with a longitudinal bore 115 formed in the sidewall of a top connector sub 120. In one or more exemplary embodiments, pressurized hydraulic fluid is delivered through the longitudinal bore 115 into an annular chamber 125 defined by a counterbore 130 which is in communication with an annular undercut 135 formed in the sidewall of the top connector sub 120. In one or more exemplary embodiments, an inner housing mandrel 140 is slidably coupled and sealed to the top connector sub 120 by a slip union 145 and a seal 150, with the undercut 135 defining an annulus between the inner housing mandrel 140 and the sidewall of top connector sub 120.

Figure 2A:
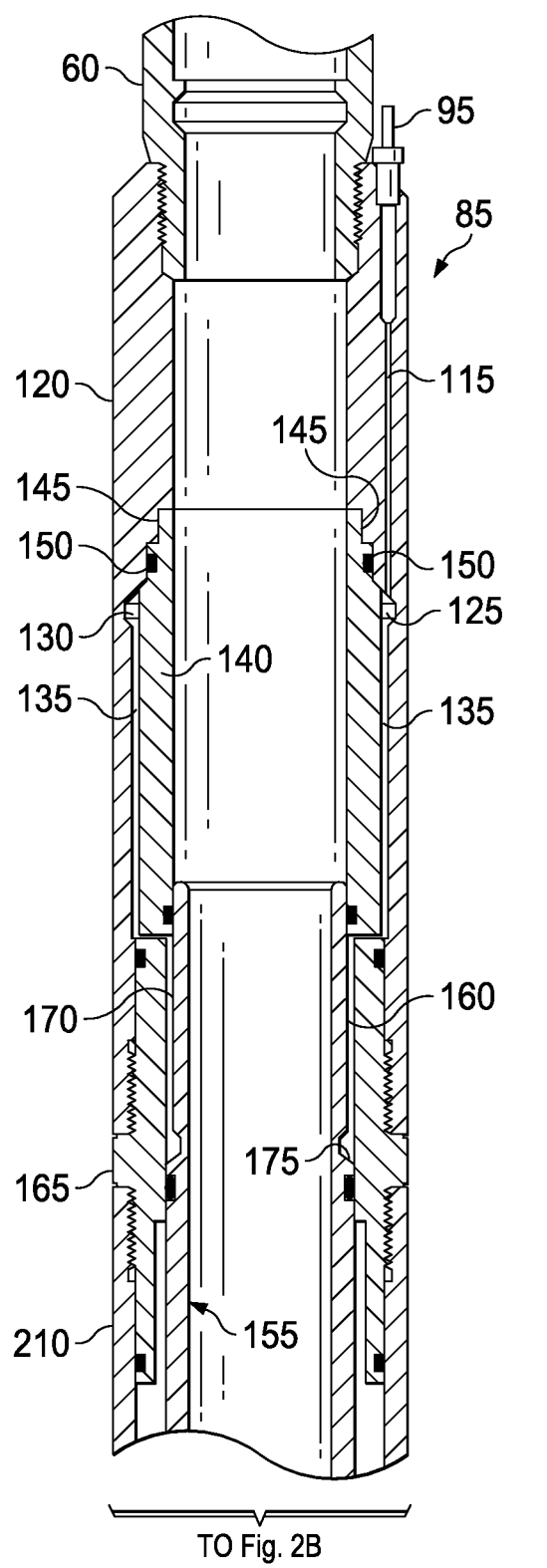
FIGS. 2A-2B are half sectional views of the subsurface safety valve of FIG. 1 in the valve open position, according to an exemplary embodiment of the present disclosure.
Figure 2B:
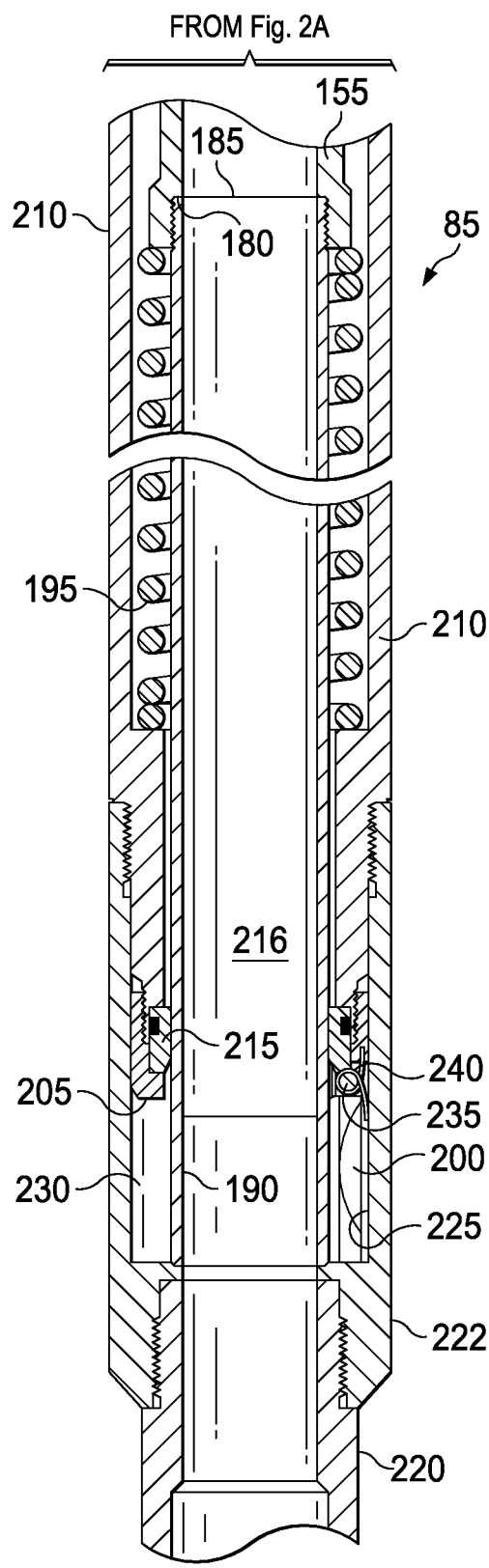

In one or more exemplary embodiments, a piston 155 is received in slidable, sealed engagement against the internal bore of the inner housing mandrel 140. In one or more exemplary embodiments, the undercut annulus 135 opens into a piston chamber 160 in the annulus between the internal bore of a connector sub 165 and the external surface of the piston 155. In one or more exemplary embodiments, the external radius of an upper sidewall piston section 170 may be machined and reduced to define a radial clearance between the piston 155 and the connector sub 165. In one or more exemplary embodiments, an annular sloping surface 175 of the piston 155 is acted against by the pressurized hydraulic fluid delivered through to control conduit 95. In one or more exemplary embodiments, and as shown in FIGS. 2A and 2B, the piston 155 is fully extended with a piston shoulder 180 engaging a top annular face 185 of an operator tube 190. In this valve open position, a return spring 195 is fully compressed.

Figure 3A:
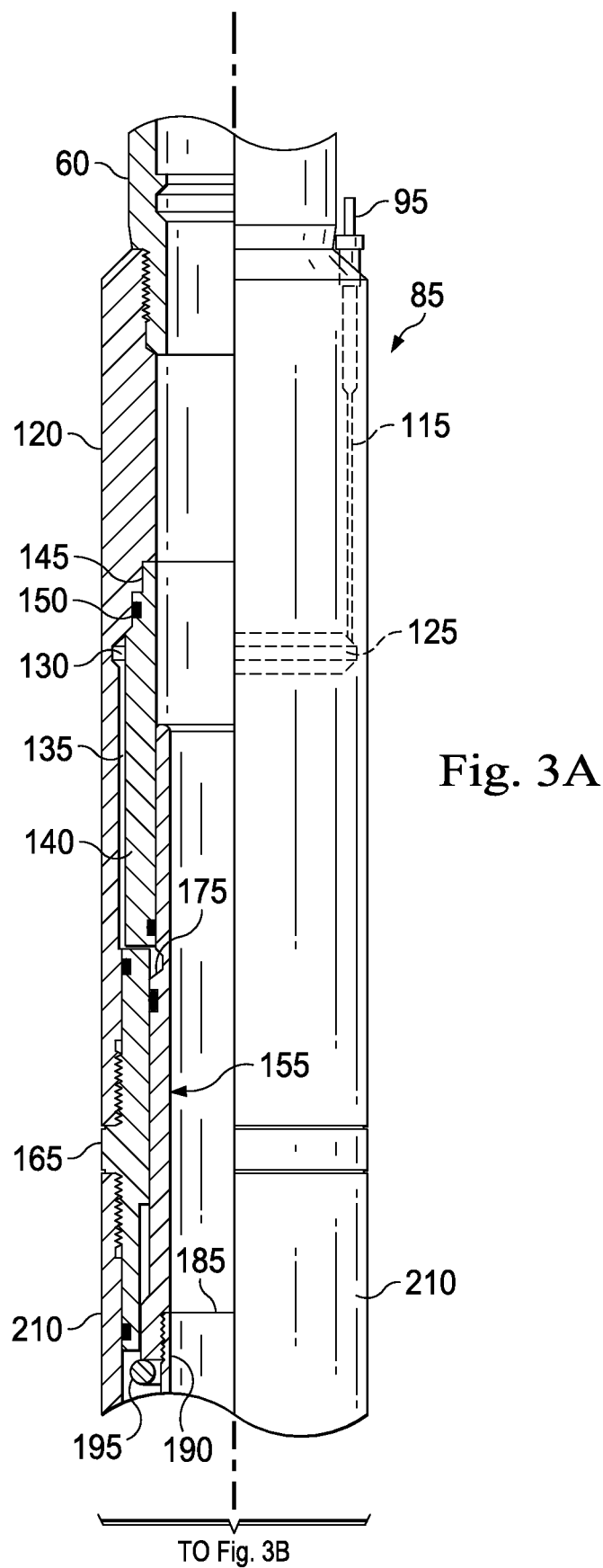
FIGS. 3A-3B are half sectional views of the subsurface safety valve of FIG. 1 in the valve closed position, according to an exemplary embodiment of the present disclosure.
Figure 3B:
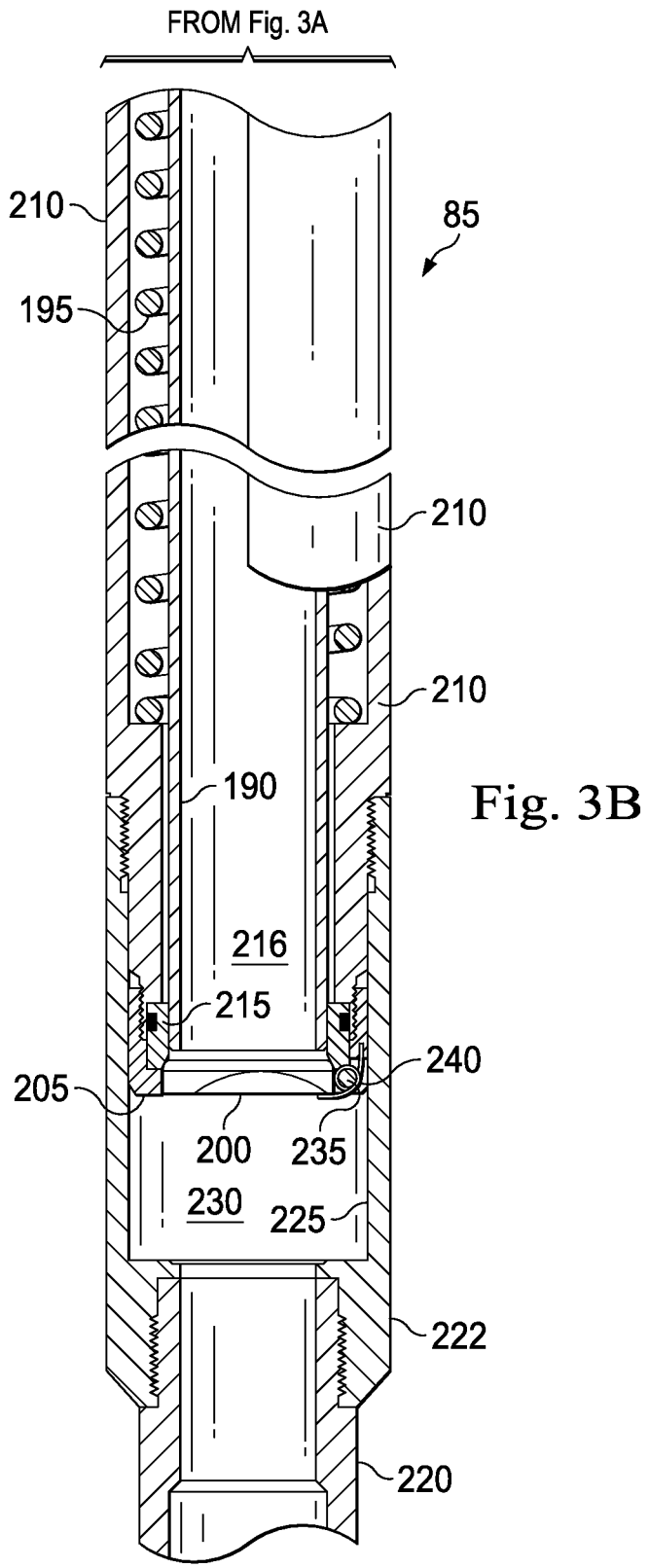

In one or more exemplary embodiments, a flapper plate 200 is pivotally mounted onto a hinge sub 205 which is threadably connected to the lower end of a spring housing 210. In one or more exemplary embodiments, a valve seat 215 is confined within a counterbore formed on the hinge sub 205. In one or more exemplary embodiments, the valve seat 215 forms a flow passage 216. In one or more exemplary embodiments, the lower end of the safety valve 85 is connected to a bottom sub connector 220 by a flapper valve housing 222. In one or more exemplary embodiments, the bottom sub connector 220 may connect to the production tubing 60. In one or more exemplary embodiments, the flapper valve housing 222 has a counterbore 225 which defines a flapper valve chamber 230. Thus, the flapper valve housing 222 forms a part of the flapper valve housing enclosure. In one or more exemplary embodiments, the flapper plate 200 pivots about a pivot pin 235 and is biased to the valve closed position as shown in FIGS. 3A and 3B by a coil spring 240. In the valve open position as shown in FIGS. 2A and 2B, the spring bias force is overcome and the flapper plate 200 is retained in the valve open position by the operator tube 190 to permit formation fluid flow up through the flow passage 216 and the tubing 60.

In one or more exemplary embodiments, and when an out-of-range condition occurs and the subsurface safety valve 85 must be operated from the valve open position to the valve closed position, hydraulic pressure is released from the conduit 95 such that the return spring 195 acts on the lower end of the piston 155 which retracts the operator tube 190 longitudinally through the flapper valve chamber 230. In one or more exemplary embodiments, the flapper closure plate 200 will then rotate through the chamber 230 to contact the valve seat 215 and prevent fluid from flowing through the flow passage 216. In one or more exemplary embodiments and as the flapper closure plate 200 nears the valve closed position within the flapper valve chamber 230 where significant throttling of fluid flow occurs, the high magnitude reaction forces may distort the operator tube 190, the flapper closure plate 200, or the pivot pin 235. In one or more exemplary embodiments, permanent deformation to the flapper closure plate 200 is often a result of reaction forces between the fully closed flapper closure plate 200 and the valve seat 215 caused by above-yield strength sealing load. In one or more exemplary embodiments, this deformation to the flapper closure plate 200 due to the reaction forces is referenced as the "taco effect." Distortion or deformation of the flapper closure plate 200, may cause misalignment of the flapper closure plate 200 with the valve seat 215. Moreover, the alignment of the flapper closure plate 200 relative to the valve seat 215 may be disturbed in response to slamming impact of the flapper closure plate 200 against the valve seat 215.

Figure 4:
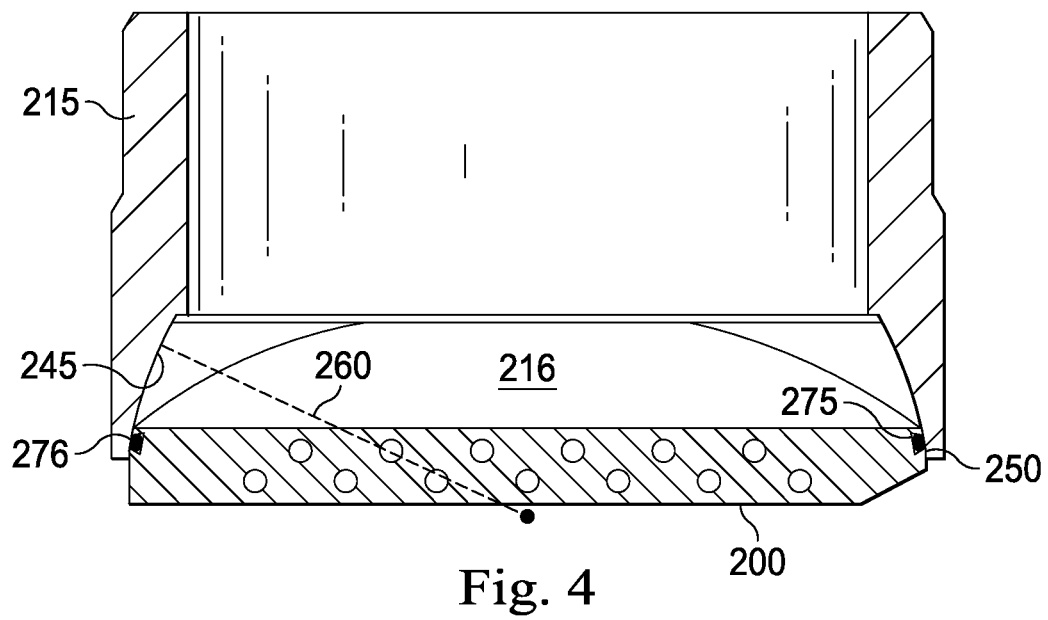
FIG. 4 is a sectional view of a flapper valve assembly in the valve closed position, according to an exemplary embodiment of the present disclosure, the flapper valve including a flapper closure plate.

Referring now to FIG. 4 and in one or more exemplary embodiments, the flapper closure plate 200 and the valve seat 215 may form a flapper valve assembly. In the illustrated embodiment, the sealing surfaces of the flapper closure plate 200 and the valve seat 215 have mating segments which are matched in curvature to provide a metal-to-metal seal. In one or more exemplary embodiments, a sealing surface 245 of the valve seat 215 is a concave spherical segment and a sealing surface 250 of the flapper closure plate 200 is a convex spherical segment. In one or more exemplary embodiments, the convex flapper closure plate sealing surface 250 and the concave valve seat sealing surface 245 are both generally a surface of revolution produced by revolving a semi-circular arc having a radius of curvature 260. As shown in FIG. 4, the radius of curvature 260 of the convex flapper closure plate sealing surface 250 is equal to the radius of curvature 260 of the concave valve seat sealing surface 245. In one or more exemplary embodiments, the radius of curvature 260 of the convex flapper closure plate sealing surface 250 is substantially equal (i.e., within 10%) to the radius of curvature 260 of the concave valve seat sealing surface 245.

In one or more exemplary embodiments, the spherical radius of curvature of the concave valve seat sealing surface 245 is matched with the spherical radius of curvature of the convex flapper closure plate sealing surface 250. As used herein, "matched radius of curvature" means that the radius of curvature of the flapper plate convex sealing surface 250 is substantially the same as, but not greater than, the radius of curvature of the concave valve seat sealing surface 245. In one or more exemplary embodiments, the convex and concave surfaces are matched in curvature to provide smooth, non-binding surface engagement of the convex flapper closure plate sealing surface 250 against the concave valve seat sealing surface 245. In one or more exemplary embodiments, the matching convex and concave spherical surfaces 250, 245 are lapped together to permit close nesting engagement of the flapper closure plate 200 within the valve seat 215. In one or more exemplary embodiments, this arrangement permits smooth angular displacement of the flapper closure plate 200 relative to the valve seat 215 without interrupting surface-to-surface engagement therebetween.

Figure 5:
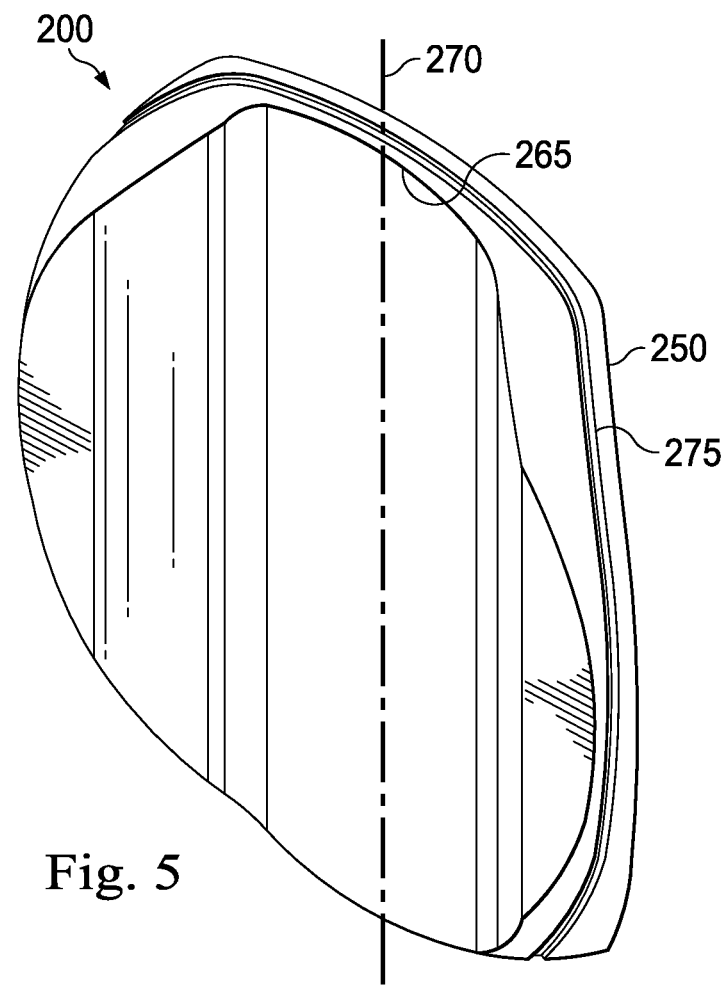
FIG. 5 is a perspective view of the flapper closure plate of FIG. 4 according to an embodiment of the present disclosure.
Figure 6:
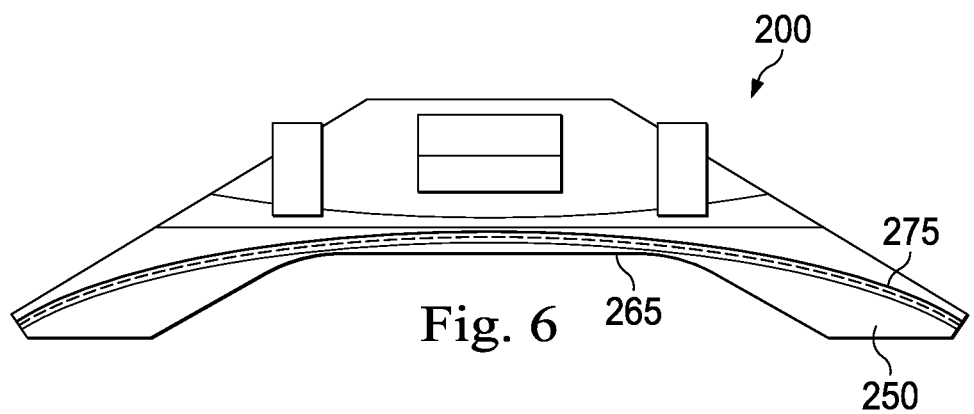
FIG. 6 illustrates a top view of the flapper closure plate of FIG. 4, according to an exemplary embodiment of the present disclosure.
Figure 7:
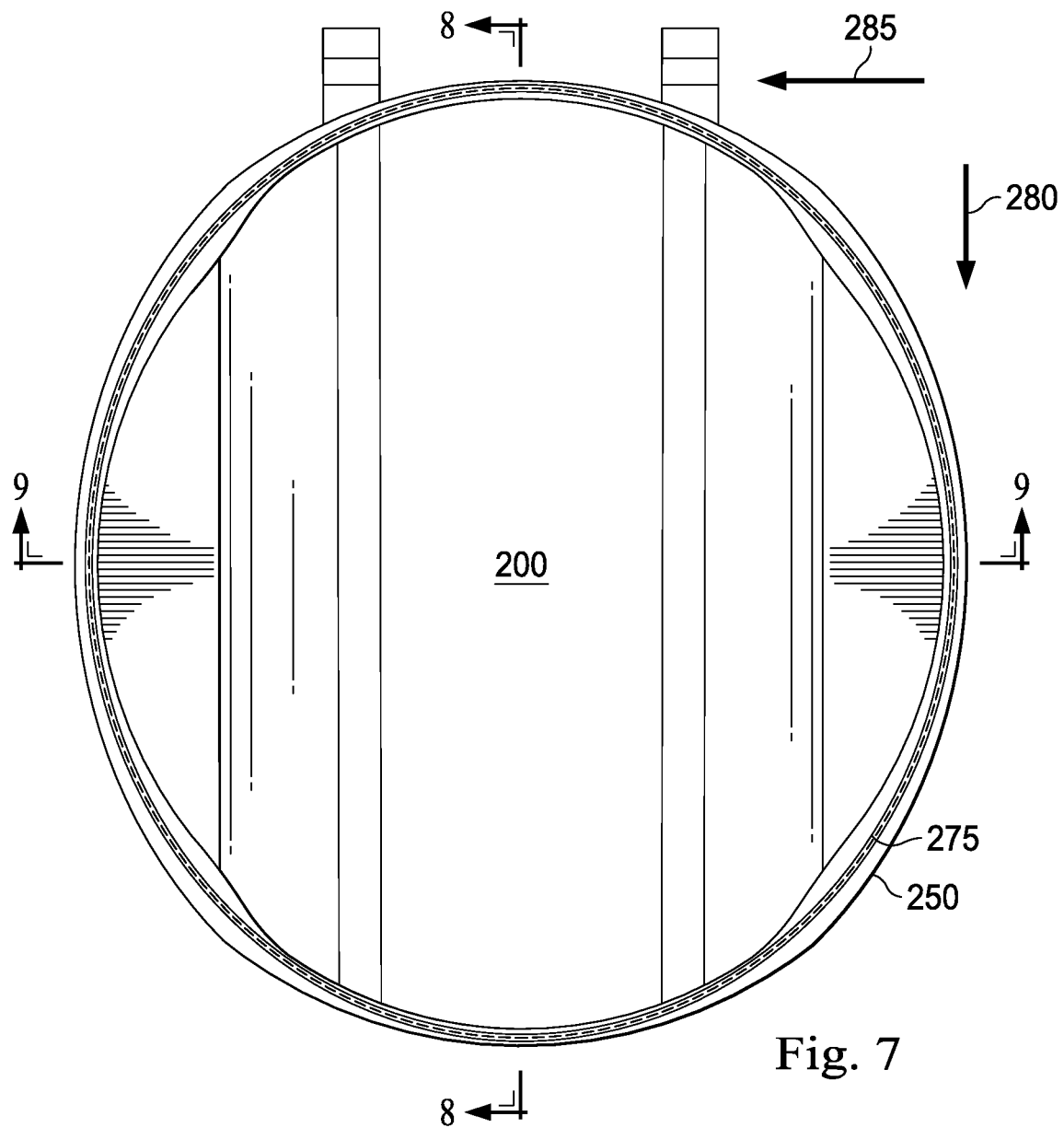
FIG. 7 illustrates a front view of the flapper closure plate of FIG. 4, according to an exemplary embodiment of the present disclosure.

In one or more exemplary embodiments, and referring now to FIGS. 5-7, the flapper closure plate 200 has a semi-cylindrical channel 265 across the front of the flapper closure plate 200 in alignment with its longitudinal axis labeled 270 in the FIG. 5. In one or more exemplary embodiments, the radial projection of the flapper closure plate 200 is minimized, so that in the valve open position as shown in FIGS. 2A-2B, the operator tube 190 is received within a semi-cylindrical channel (not shown), with the convex spherical sealing surface 250 projecting into the annulus between the operator tube 190 and the flapper housing 222. In one or more exemplary embodiments, an indentation, or channel 275, is formed on an external surface of the body 200a (shown in FIGS. 9-11) of the flapper closure plate 200. In one or more exemplary embodiments, the channel 275 is the indentation, but a variety of surface features may be the indentation. In an exemplary embodiment the channel 275 extends from the sealing surface 250. In one or more exemplary embodiments, the channel 275 is structurally configured to accommodate a seal 276 (shown in FIG. 4). In one or more exemplary embodiments, the seal 276 may be an o-ring. In one or more exemplary embodiments, the seal 276 may be an elastomeric or a non-elastomeric materials. IN one or more exemplary embodiments, the seal 276 may comprise a metallic or semi-metallic material. In one or more exemplary embodiments, the channel 275 may extend anywhere along the sealing surface 250. In one or more exemplary embodiments, the channel 275 is a continuous channel or loop that extends along a circumference of the sealing surface 250 and around the flow passage 216. In one or more exemplary embodiments, the channel 275 is one of a plurality of channels that increase sealing stress.

Figure 8:
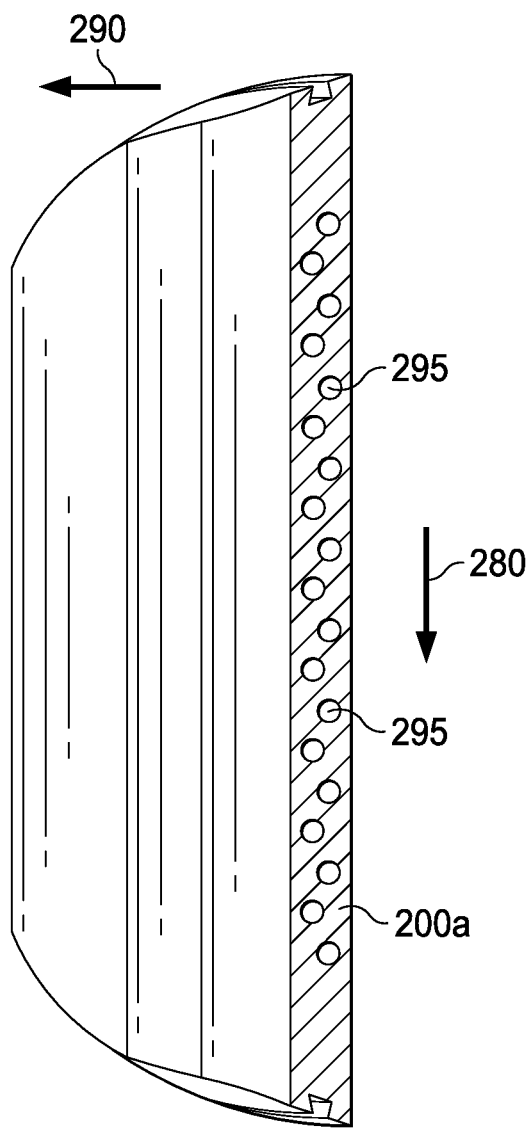
FIG. 8 illustrates a sectional view of the flapper closure plate of FIG. 4, according to an exemplary embodiment of the present disclosure.

In one or more exemplary embodiments, the flapper closure plate 200 has a height measured along the direction identified by the numeral 280 in the FIGS. 7-8 and has a width measured along the direction identified by the numeral 285 in the FIG. 7. In one or more exemplary embodiments, the flapper closure plate 200 also has a depth measured along the direction identified by the numeral 290 in FIGS. 8 and 9.

Figure 9:
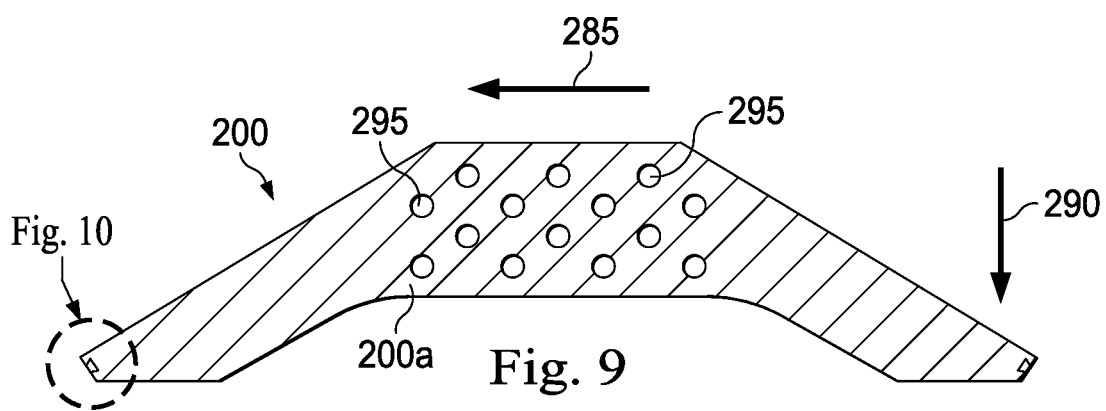
FIG. 9 illustrates another sectional view of the flapper closure plate of FIG. 4, according to an exemplary embodiment of the present disclosure.

In one or more exemplary embodiments, and referring to FIGS. 8-9, the flapper closure plate 200 includes a plurality of voids 295 within a body 200a of the flapper closure plate 200. In one or more exemplary embodiment, at least one void within the plurality of voids is an internal void. In an one or more exemplary embodiments, an internal void is a void that is spaced from an external surface such, as a sealing surface, or is a void that does not penetrate the external surface. In one or more exemplary embodiments, the plurality of voids 295 are spaced along the height of the flapper closure plate 200. In one or more exemplary embodiments, the plurality of voids 295 are spaced along the width and depth of the flapper closure plate 200. In one or more exemplary embodiments, the spacing of the plurality of voids 295 along the height, width, and depth of the flapper closure plate 200 forms a void array. In one or more exemplary embodiments, the plurality of voids 295 may be a variety of shapes, such as a spherical, a cone, a pyramid, a cube, a cylinder, etc. In one or more exemplary embodiments, the plurality of voids 295 may be spaced in a variety of arrays to form a porous flapper closure plate 200. Thus, a portion of the flapper closure plate 200 is "hollowed" using voids 295, such as spherical voids, with same or different sizes, or voids of other shapes, such as honeycomb. In one or more exemplary embodiments, the density of the voids 295 may be uniform or gradient. In one or more exemplary embodiments, each of the voids in the plurality of voids 295 is of engineered size distribution and void density distribution. In one or more exemplary embodiments, the plurality of voids is pre-determined by numerical analysis and do not detract from mechanical strength performance. The flapper closure plate 200 may only have one internal void instead of a plurality of voids 295.

Figure 10:
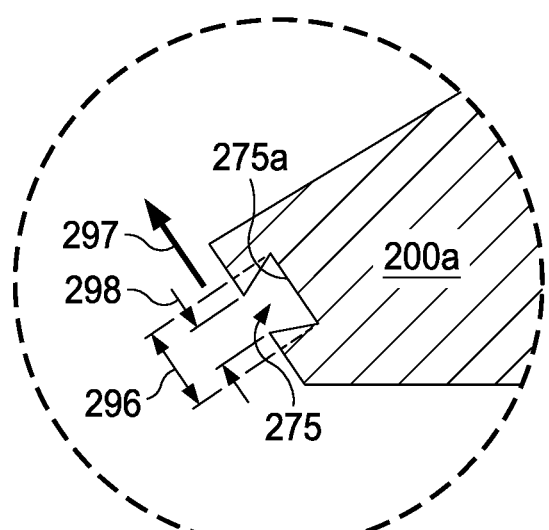
FIG. 10 illustrates a sectional view of a portion of the flapper closure plate of FIG. 4, according to an exemplary embodiment of the present disclosure.

In one or more exemplary embodiments and as shown in FIGS. 9 and 10, the channel 275 has an opening having a height 296 measured along the direction identified by the numeral 297 in the FIG. 10. In one or more exemplary embodiments, the channel 275 defines a channel surface 275a that extends within the body 200a of the flapper closure plate 200, the channel surface 275a defines a height 298 measured along the direction identified by the numeral 297 in the FIG. 10 within the body 200a. In one or more exemplary embodiments, the height 296 is greater than the height 298. In one or more exemplary embodiments, a cross-section of the channel 275 forms a keystone shape such that the opening of the channel 275 is smaller than a base, or a floor, of the channel 275. However, the cross-section of the channel 275 may form any shape, such as a rectangle, square, circle, etc.

In one or more exemplary embodiments, the plurality of voids 295 may reduce mass and weight of the flapper closure plate 200. In one or more exemplary embodiments, the plurality of voids 295 may reduce the mass and weight of the flapper closure plate 200 by 20%-50% of conventional flapper closure plates. In one or more exemplary embodiments, the flapper closure plate 200 having the plurality of voids 295 may enable uniform bending stiffness along the sealing circumference, thereby reducing what is often referred to as the "taco effect," or the bending of the flapper closure plate 200 in response to localized pressures. In one or more exemplary embodiments, the flapper closure plate 200 may also reduce potential flapper pin failure during slam-shut due to reduced inertia and impact energy absorption due to deformation at hollowed area. In one or more exemplary embodiments, the flapper closure plate 200 has a low mass, which reduces required closing spring forces. In one or more exemplary embodiments, the plurality of voids 295 can coalesce to form channels, forests, dents and many other distinctive features to achieve weight reduction and uniform bending stiffness along the body 200a of the flapper closure plate 200.

Figure 11:
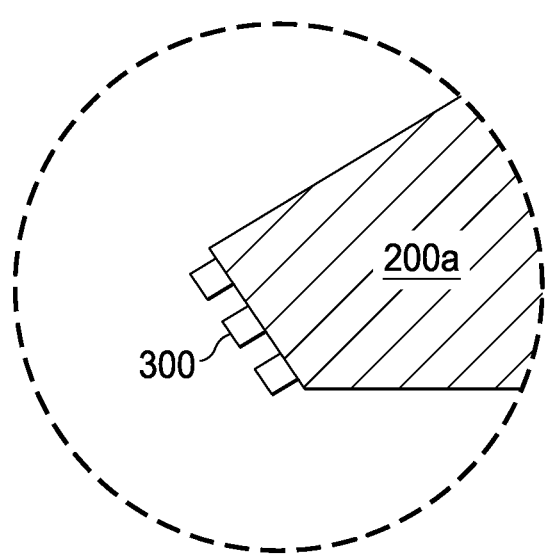
FIG. 11 illustrates a sectional view of a portion of the flapper closure plate for FIG. 4, according to another exemplary embodiment of the present disclosure.

Exemplary embodiments of the present disclosure may be altered in a variety of ways. For example, in one or more exemplary embodiments and as shown in FIG. 11, the channel 275 of the flapper closure plate 200 may be omitted and a material may be overlaid over the sealing surface 250, such as a protrusion 300 that extends from the sealing surface 250 of the flapper closure plate 200. In one or more exemplary embodiments, the protrusion is considered a "stand proud" element that extends from the flapper closure plate 200 by several thousandths of an inch. In one or more exemplary embodiments, the protrusion 300 provides an embeddable surface that is compliant with sand and other foreign matter. In one or more exemplary embodiments, the protrusion 300 is compressible so as to not affect the metal-to-metal seal integrity between the sealing surfaces 245, 250. In one or more exemplary embodiments, a plurality of protrusions may extend from the sealing surface 250. In one or more exemplary embodiments, the protrusion 300 assists in sealing performance in sand laden environments. In one or more exemplary embodiments, the material overlaid over the sealing surface 250 lower tensile strength but is noble to the environment.

In one or more exemplary embodiments, an interior portion of the body 200a is "porous", such that the plurality of voids 295 are spaced from the exterior surface of the flapper closure plate 200 and reduce the mass of the flapper closure plate 200 between 20%-50% less than a solid flapper closure plate without a plurality of voids 295 while having uniform stiffness along the flapper closure plate 200.

Figure 12:
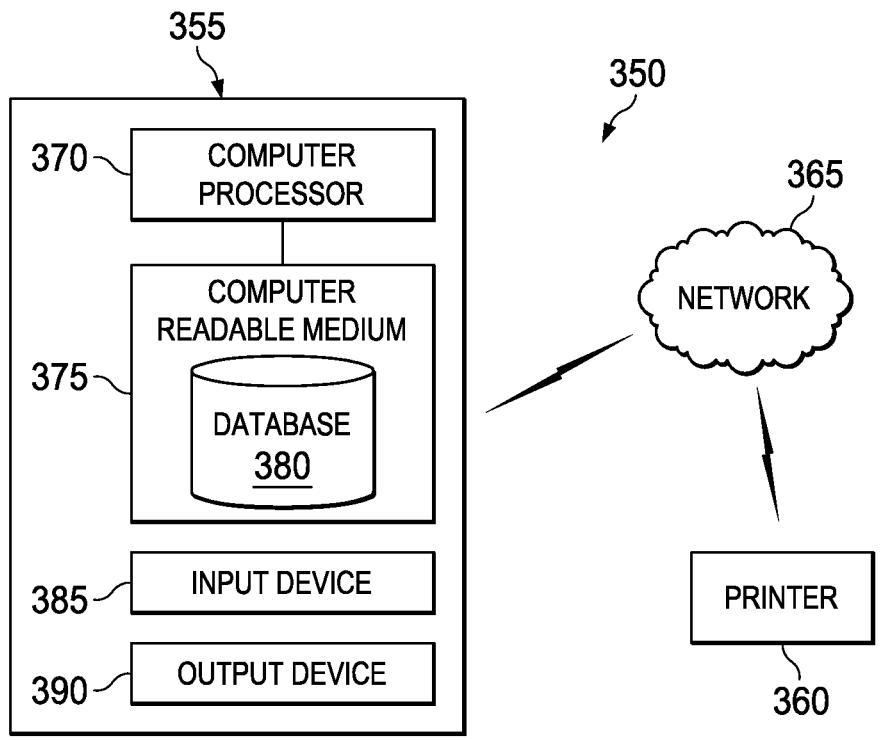
FIG. 12 illustrates an additive manufacturing system, according to an exemplary embodiment.

In an exemplary embodiment and as shown in FIG. 12, a downhole tool printing system 350 includes one or more computers 355 and a printer 360 that are operably coupled together, and in communication via a network 365. In one or more exemplary embodiments, the flapper closure plate 200 may be manufactured using the downhole tool printing system 350. However, the downhole tool printing system 350 may be used to manufacture a variety of downhole tools. In one or more exemplary embodiments, the downhole tool printing system 350 may modify existing parts in situ or interactively upgrade existing parts in real time during the development process to further accelerate a prototyping process. In one or more exemplary embodiments, examples of modifying downhole tools in situ may be upgrading hinge structures; adding material strategically to improve strength to enable uniform bending stiffness along the sealing surface 250; and/or adding sealing features, such as the protrusion 300 to an existing flapper closure plate 200 that did not include the protrusion 300.

In one or more exemplary embodiments, the one or more computers 355 includes a computer processor 370 and a computer readable medium 375 operably coupled thereto. In one or more exemplary embodiments, the computer processor 370 includes one or more processors. Instructions accessible to, and executable by, the computer processor 370 are stored on the computer readable medium 375. A database 380 is also stored in the computer readable medium 375. In one or more exemplary embodiments, the computer 355 also includes an input device 385 and an output device 390. In one or more exemplary embodiments, web browser software is stored in the computer readable medium 375. In one or more exemplary embodiments, three dimensional modeling software is stored in the computer readable medium. In one or more exemplary embodiments, software that includes advanced numerical methods for topology optimization, which assists in determining optimum void shape, void size distribution, and void density distribution or other topological features in the flapper closure plate 200, is stored in the computer readable medium. In one or more exemplary embodiments, software involving finite element analysis and topology optimization is stored in the computer readable medium 375. In one or more exemplary embodiments, any one or more constraints are entered in the input device 385 such that the software aids in the design on a flapper closure plate 200 in which specific portions of the body 200a of the flapper closure plate 200 remain solid (i.e., no voids are formed). In one or more exemplary embodiments, specific portions of the body 200a of the flapper closure plate 200 that remain solid are for example, the sealing surface 250. In one or more exemplary embodiments, the input device 385 is a keyboard, mouse, or other device coupled to the computer 355 that sends instructions to the computer 355. In one or more exemplary embodiments, the input device 385 and the output device 390 include a graphical display, which, in several exemplary embodiments, is in the form of, or includes, one or more digital displays, one or more liquid crystal displays, one or more cathode ray tube monitors, and/or any combination thereof. In one or more exemplary embodiments, the output device 390 includes a graphical display, a printer, a plotter, and/or any combination thereof. In one or more exemplary embodiments, the input device 385 is the output device 390, and the output device 390 is the input device 385. In several exemplary embodiments, the computer 355 is a thin client. In several exemplary embodiments, the computer 355 is a thick client. In several exemplary embodiments, the computer 355 functions as both a thin client and a thick client. In several exemplary embodiments, the computer 355 is, or includes, a telephone, a personal computer, a personal digital assistant, a cellular telephone, other types of telecommunications devices, other types of computing devices, and/or any combination thereof. In one or more exemplary embodiments, the computer 355 is capable of running or executing an application. In one or more exemplary embodiments, the application is an application server, which in several exemplary embodiments includes and/or executes one or more web-based programs, Intranet-based programs, and/or any combination thereof. In one or more exemplary embodiments, the application includes a computer program including a plurality of instructions, data, and/or any combination thereof. In one or more exemplary embodiments, the application written in, for example, HyperText Markup Language (HTML), Cascading Style Sheets (CSS), JavaScript, Extensible Markup Language (XML), asynchronous JavaScript and XML (Ajax), and/or any combination thereof.

In one or more exemplary embodiments, the printer 360 is a three-dimensional printer. In one or more exemplary embodiments, the printer 360 includes a layer deposition mechanism for depositing material in successive adjacent layers; and a bonding mechanism for selectively bonding one or more materials deposited in each layer. In one or more exemplary embodiments, the printer 360 is arranged to form a unitary printed body by depositing and selectively bonding a plurality of layers of material one on top of the other. In one or more exemplary embodiments, the printer 360 is arranged to deposit and selectively bond two or more different materials in each layer, and wherein the bonding mechanism includes a first device for bonding a first material in each layer and a second device, different from the first device, for bonding a second material in each layer. In one or more exemplary embodiments, the first device is an ink jet printer for selectively applying a solvent, activator or adhesive onto a deposited layer of material. In one or more exemplary embodiments, the second device is a laser for selectively sintering material in a deposited layer of material. In one or more exemplary embodiments, the layer deposition means includes a device for selectively depositing at least the first and second materials in each layer. In one or more exemplary embodiments, any one of the two or more different materials may be ABS plastic, PLA, polyamide, glass filled polyamide, sterolithography materials, silver, titanium, steel, wax, photopolymers, polycarbonate, and a variety of other materials. In one or more exemplary embodiments, the printer 360 may involve fused deposition modeling, selective laser sintering, and/or multi jet modeling. In operation, the computer processor 370 executes a plurality of instructions stored on the computer readable medium 375. As a result, the computer 355 communicates with the printer 360, causing the printer 360 to manufacture the flapper closure plate 200 or at least a portion thereof. In one or more exemplary embodiments, manufacturing the flapper closure plate 200 using the system 350 results in an integrally formed flapper closure plate 200.

Figure 13:
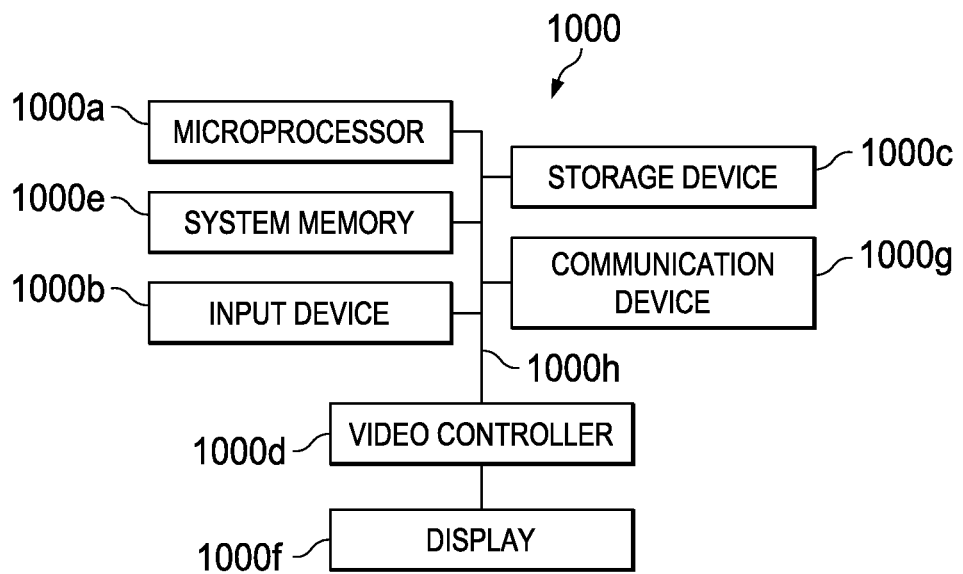
FIG. 13 is a diagrammatic illustration of a node for implementing one or more exemplary embodiments of the present disclosure, according to an exemplary embodiment.

In one or more exemplary embodiments, as illustrated in FIG. 13 with continuing reference to FIGS. 1, 2A, 2B, 3A, 3B, 4, 5, 6, 7, 8, 9, 10, 11, and 12, an illustrative computing device 1000 for implementing one or more embodiments of one or more of the above-described networks, elements, methods and/or steps, and/or any combination thereof, is depicted. The computing device 1000 includes a processor $1000a$, an input device $1000b$, a storage device $1000c$, a video controller $1000d$, a system memory $1000e$, a display $1000f$, and a communication device $1000g$, all of which are interconnected by one or more buses $1000h$. In several exemplary embodiments, the storage device $1000c$ may include a floppy drive, hard drive, CD-ROM, optical drive, any other form of storage device and/or any combination thereof. In several exemplary embodiments, the storage device $1000c$ may include, and/or be capable of receiving, a floppy disk, CD-ROM, DVD-ROM, or any other form of computer readable medium that may contain executable instructions. In one or more exemplary embodiments, the computer readable medium is a non-transitory tangible media. In several exemplary embodiments, the communication device $1000g$ may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, the one or more computers 355, the printer 360, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, one or more computers 355, and the printer 360 and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In one or more exemplary embodiments, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In one or more exemplary embodiments, a data structure may provide an organization of data, or an organization of executable code.

In several exemplary embodiments, the network 365, and/or one or more portions thereof, may be designed to work on any specific architecture. In one or more exemplary embodiments, one or more portions of the network 365 may be executed on a single computer, local area networks, client-server networks, wide area networks, internets, handheld and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In one or more exemplary embodiments, the data contained in the location of a character file can be mapped to a field in a second table. In several exemplary embodiments, the physical location of the database is not limiting, and the database may be distributed. In one or more exemplary embodiments, the database may exist remotely from the server, and run on a separate platform. In one or more exemplary embodiments, the database may be accessible across the Internet. In several exemplary embodiments, more than one database may be implemented.

In several exemplary embodiments, a computer program, such as a plurality of instructions stored on a computer readable medium, such as the computer readable medium 375, the system memory 1000e, and/or any combination thereof, may be executed by a processor to cause the processor to carry out or implement in whole or in part the operation of the system 350, and/or any combination thereof. In several exemplary embodiments, such a processor may include one or more of the computer processor 370, the processor 1000a, and/or any combination thereof. In several exemplary embodiments, such a processor may execute the plurality of instructions in connection with a virtual computer system.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 1000a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

In one or more exemplary embodiments, the instructions may be generated, using in part, advanced numerical method for topology optimization to determine optimum void shape, void size and distribution, and void density distribution for the plurality of voids 295, or other topological features.

During operation of the system 350, the computer processor 370 executes the plurality of instructions that causes the manufacture of the flapper closure plate 200 using additive manufacturing. Thus, the flapper closure plate 200 is at least partially manufactured using an additive manufacturing process. Manufacturing the flapper closure plate 200 using additive manufacturing, or three-dimensional printing, may avoid the use of machining forged billet stock using multi-axis milling processes, which often limits the geometries and design of the flapper closure plate 200. Thus, with additive manufacturing, complex geometries—such as internal voids 295 and channels 275—are achieved or allowed, which allows for weight reduction of the flapper closure plate 200. In one or more exemplary embodiments, the size of the flapper closure plate 200 is independent from the weight of the flapper closure plate 200. In one or more exemplary embodiments, this allows for reduced loads and reduced stresses on a torsion closing spring regardless of the size of the flapper closure plate 200. Additionally, the low flapper weight may result in quick valve closure, which may increase safety valve performance. In one or more exemplary embodiments, the use of three-dimensional, or additive, manufacturing to manufacture downhole equipment, such as the flapper closure plate 200, will allow increased flexibility in the strategic placement of material to optimize strength during design, reduce weight, and/or allow addition or incorporation of other features not easily attained. During operation of the system 350, the computer processor 370 executes the plurality of instructions that causes the manufacture of the seal 276 using additive manufacturing. Thus, the seal 276 is at least partially manufactured using an additive manufacturing process. In one or more exemplary embodiments, the use of three-dimensional manufacturing to manufacture downhole equipment, such as the flapper closure plate 200, will enable features that are not readily machined into flapper valve closure plates, such as resilient seals that enhance a safety valve's closure and sealing performance.

In one or more exemplary embodiments, the method of using the system 350 results in an in-situ application of three-dimensional printing for improvement of prototypes.

Thus, a subsurface tool has been described. Embodiments of the subsurface tool may generally include a flapper closure plate having an integrally formed body, the flapper closure plate including at least one of: an internal void located within the body of the flapper closure plate; and an indentation extending from an exterior surface of the body of the flapper closure plate, the indentation having an opening defining a first dimension along a first direction at the exterior surface of the body, the indentation defining an indentation surface extending within the body, the indentation surface defining a second dimension along the first direction within the body, the second dimension being greater than the first dimension. Likewise, an apparatus has been described. Embodiments of the apparatus may generally include a non-transitory computer readable medium; and a plurality of instructions stored on the non-transitory computer readable medium and executable by one or more processors, the plurality of instructions including instructions that cause the manufacture of a flapper closure plate that has an integrally formed body, the flapper closure plate including at least one of: an internal void located within a body of the flapper closure plate; and an indentation extending from an exterior surface of the body of the flapper closure plate, the indentation having an opening defining a first dimension along a first direction at the exterior surface of the body, the indentation defining an indentation surface extending within the body, the indentation surface defining a second dimension along the first direction within the body, the second dimension being greater than the first dimension; wherein when the one or more processors execute the plurality of instructions, the flapper closure plate is manufactured. Any of the foregoing embodiments may include any one of the following elements, alone or in combination with each other:

A tubular valve housing having a valve chamber; and a valve seat mounted within the housing having a valve seat sealing surface, the valve seat defining a flow passage therethrough; and wherein the flapper closure plate is rotatably disposed within the valve chamber and is rotatable between a valve open position in which the flapper closure plate is removed from the valve seat and a valve closed position in which a sealing surface of the flapper closure plate sealingly engages the valve seat sealing surface for preventing flow through the flow passage.

The flapper closure plate includes the internal void.

The flapper closure plate includes the indentation.

The internal void is one of a plurality of internal voids.

The plurality of internal voids form a void array.

The indentation is a channel formed within a circumference of the sealing surface of the flapper closure plate.

The channel is a keystone shaped channel.

The flapper closure plate includes the indentation, the indentation being a channel formed within a circumference of the sealing surface of the flapper closure plate; and the flapper valve assembly further includes an elastomeric seal accommodated within the channel.

The sealing surface of the flapper closure plate forms a convex spherical segment having radius of curvature; and wherein the valve seat sealing surface forms a concave spherical segment having a radius of curvature that is substantially matched with the radius of curvature of the convex spherical segment of the flapper closure plate to permit nesting engagement of the convex spherical segment of the flapper closure plate and the elastomeric seal against the concave spherical segment of the valve seat.

The flapper closure plate further includes a protrusion located along the sealing surface of the flapper closure plate.

The flapper closure plate further includes a protrusion located along the sealing surface of the flapper closure plate; the sealing surface of the flapper closure plate forms a convex spherical segment having radius of curvature; and the valve seat sealing surface forms a concave spherical segment having a radius of curvature that is substantially matched with the radius of curvature of the convex spherical segment of the flapper closure plate to permit nesting engagement of the convex spherical segment of the flapper closure plate and the protrusion against the concave spherical segment of the valve seat.

The flapper closure plate is at least partially manufactured using an additive manufacturing process.

Thus, a method for controlling flow of a fluid in a wellbore system has been described. Embodiments of the method generally include providing a flapper valve assembly including: a tubular valve housing having a valve chamber; a valve seat mounted within the housing having a valve seat sealing surface, the valve seat defining a flow passage therethrough; and a flapper closure plate that is rotatably disposed within the valve chamber and that is rotatable between a valve open position in which the flapper closure plate is removed from the valve seat and a valve closed position in which a sealing surface of the flapper closure plate sealingly engages the valve seat sealing surface for preventing flow through the flow passage; and allowing flow of the fluid in the wellbore system when the flapper closure plate is in the open position; wherein the flapper closure plate has an integrally formed body, the flapper closure plate including at least one of: an internal void located within the body of the flapper closure plate; and an indentation extending from an exterior surface of the body of the flapper closure plate, the indentation having an opening defining a first dimension along a first direction at the exterior surface of the body, the indentation defining an indentation surface extending within the body, the indentation surface defining a second dimension along the first direction within the body, the second dimension being greater than the first dimension. For any of the foregoing embodiments, the method may include any one of the following limitations, alone or in combination with each other:

The flapper closure plate includes the internal void and the internal void is one of a plurality of internal voids that form a void array.

The flapper closure plate includes the indentation; and the indentation is a channel formed within a circumference of the sealing surface of the flapper closure plate.

The flapper closure plate is at least partially manufactured using an additive manufacturing process.

The foregoing description and figures are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

What is claimed is:

1. A subsurface tool comprising:
a tubular valve housing having a valve chamber, the housing being configured to connect to a bottom sub connector; and
a flapper closure plate having an integrally formed body, the flapper closure plate comprising:
an internal void located within the body of the flapper closure plate, and
an indentation extending from an exterior surface of the body of the flapper closure plate, the indentation having an opening defining a first dimension along a first direction at the exterior surface of the body, the indentation defining an indentation surface extending within the body, the indentation surface defining a second dimension along the first direction within the body, the second dimension being greater than the first dimension;
wherein the flapper closure plate is solid in a thickness direction at a position interior to the indentation.

2. The subsurface tool of claim 1, further comprising:
a valve seat mounted within the housing having a valve seat sealing surface, the valve seat defining a flow passage therethrough; and
wherein the flapper closure plate is rotatably disposed within the valve chamber and is rotatable between a valve open position in which the flapper closure plate is removed from the valve seat and a valve closed position in which a sealing surface of the flapper closure plate sealingly engages the valve seat sealing surface for preventing flow through the flow passage.

3. The subsurface tool of claim 1, wherein the internal void is one of a plurality of internal voids.

4. The subsurface tool of claim 3, wherein the plurality of internal voids form a void array.

5. The subsurface tool of claim 2,
wherein the indentation is a channel formed within a circumference of the sealing surface of the flapper closure plate.

6. The subsurface tool of claim 5, wherein the channel is a keystone shaped channel.

7. The subsurface tool of claim 2,
wherein the indentation is a channel formed within a circumference of the sealing surface of the flapper closure plate; and
further comprising an elastomeric seal accommodated within the channel.

8. The subsurface tool of claim 7,
wherein the sealing surface of the flapper closure plate forms a convex spherical segment having radius of curvature; and
wherein the valve seat sealing surface forms a concave spherical segment having a radius of curvature that is substantially matched with the radius of curvature of the convex spherical segment of the flapper closure plate to permit nesting engagement of the convex spherical segment of the flapper closure plate and the elastomeric seal against the concave spherical segment of the valve seat.

9. The subsurface tool of claim 2, wherein the flapper closure plate further comprises a protrusion located along the sealing surface of the flapper closure plate.

10. The subsurface tool of claim 2,
wherein the flapper closure plate further comprises a protrusion located along the sealing surface of the flapper closure plate;
wherein the sealing surface of the flapper closure plate forms a convex spherical segment having radius of curvature; and
wherein the valve seat sealing surface forms a concave spherical segment having a radius of curvature that is substantially matched with the radius of curvature of the convex spherical segment of the flapper closure plate to permit nesting engagement of the convex spherical segment of the flapper closure plate and the protrusion against the concave spherical segment of the valve seat.

11. The subsurface tool of claim 1, wherein the flapper closure plate is at least partially manufactured using an additive manufacturing process.

12. An apparatus comprising:
a non-transitory computer readable medium; and
a plurality of instructions stored on the non-transitory computer readable medium and executable by one or more processors, the plurality of instructions comprising:
instructions that cause the manufacture of a flapper closure plate that has an integrally formed body, the flapper closure plate comprising at least one of:
an internal void located within a body of the flapper closure plate; and
an indentation extending from an exterior surface of the body of the flapper closure plate, the indentation having an opening defining a first dimension along a first direction at the exterior surface of the body, the indentation defining an indentation surface extending within the body, the indentation surface defining a second dimension along the first direction within the body, the second dimension being greater than the first dimension;
wherein, when the one or more processors execute the plurality of instructions, the flapper closure plate is manufactured.

13. The apparatus of claim 12, wherein the flapper closure plate comprises the internal void and the internal void is one of a plurality of internal voids that form a void array.

14. The apparatus of claim 12,
wherein the flapper closure plate comprises the indentation; and
wherein the indentation is a channel formed within a circumference of a sealing surface of the flapper closure plate.

15. A method for controlling flow of a fluid in a wellbore system, the method comprising:
providing a flapper valve assembly comprising:
a tubular valve housing having a valve chamber;
a valve seat mounted within the housing having a valve seat sealing surface, the valve seat defining a flow passage therethrough; and
a flapper closure plate that is rotatably disposed within the valve chamber and that is rotatable between a valve open position in which the flapper closure plate is removed from the valve seat and a valve closed position in which a sealing surface of the flapper closure plate sealingly engages the valve seat sealing surface for preventing flow through the flow passage; and
allowing flow of the fluid in the wellbore system when the flapper closure plate is in the open position;
wherein the flapper closure plate has an integrally formed body, the flapper closure plate comprising:
an internal void located within the body of the flapper closure plate, and an indentation extending from an exterior surface of the body of the flapper closure plate, the indentation having an opening defining a first dimension along a first direction at the exterior surface of the body, the indentation defining an indentation surface extending within the body, the indentation surface defining a second dimension along the first direction within the body, the second dimension being greater than the first dimension; and wherein the flapper closure plate is solid in a thickness direction at a position interior to the indentation.

16. The method of claim 15, wherein the internal void is one of a plurality of internal voids that form a void array.

17. The method of claim 15, wherein the indentation is a channel formed within a circumference of the sealing surface of the flapper closure plate.

18. The method of claim 15, wherein the flapper closure plate is at least partially manufactured using an additive manufacturing process.

19. The subsurface tool of claim 1, wherein the internal void does not penetrate an exterior surface of the body of the flapper closure plate.

20. The method of claim 15, wherein the internal void does not penetrate an exterior surface of the body of the flapper closure plate.

21. The subsurface tool of claim 1, further comprising a plurality of internal voids within the body of the flapper closure plate, wherein a density of the voids within the body is gradated.

* * * * *